United States Patent Office 3,234,215
Patented Feb. 8, 1966

3,234,215
4-ALKYL-$\Delta^{1,3,5(10)}$-19-NORPREGNATRIENE-1,16,17-TRIOL-20-ONES AND ACETALS AND KETALS THEREOF
Patrick A. Diassi, Westfield, N.J., assignor to Olin Mathieson Chemical Corporation, New York, N.Y., a corporation of Virginia
No Drawing. Filed May 20, 1964, Ser. No. 368,981
5 Claims. (Cl. 260—239.55)

This invention relates to and has for its object the provision of new physiologically active steroids of the formula

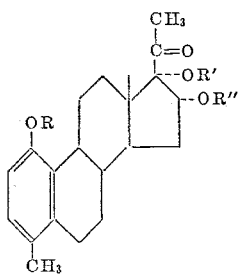

wherein R is selected from the group consisting of hydrogen and the acyl radical of a hydrocarbon carboxylic acid of less than ten carbon atoms; R' and R" are each hydrogen; and together R' and R" is

wherein P is hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group consisting of monocyclic cycloalkyl and monocyclic heterocyclic.

The compounds of this invention are physiologically active substances which possess progestational activity and hence can be used in lieu of known progestational agents, such as progesterone, in the treatment of habitual abortion. For this purpose, they can be administered in the same manner as progesterone, for example, the dosage being adjusted for the relative potency of the particular steroid.

The final products of this invention may be prepared according to the processes of this invention beginning with a compound of the formula

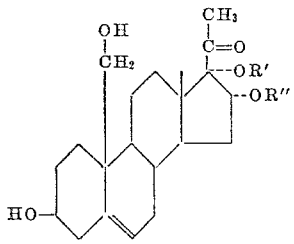

wherein R' and R" are as hereinbefore defined. The starting materials of this invention may be prepared in accordance with the procedures set forth in copending application, Serial No. 355,932, filed March 30, 1964, which is a continuation-in-part of application, Serial No. 268,605, filed March 28, 1963, in the name of Patrick Andrew Diassi, both now abandoned.

In the first step of the process of this invention, the 19-hydroxylated starting materials are treated with aluminum isoporopoxide and acetone to yield the 1-hydroxy-4-alkyl-$\Delta^{1,3,5(10)}$-19-norpregnatriene compounds of this invention.

If the 19-hydroxy starting materials employed in the process of this invention are the 16,17-acetal or ketal derivatives, the respective acetal and ketal group will carry through to the final products giving the respective 16,17-acetal or ketal derivative of 4-alkyl-$\Delta^{1,3,5(10)}$-19-norpregnatriene-1,16α,17α-triol-20-one, which are new final products of this invention.

If a ketal or acetal group other than that present in the starting material or final product is desired, the respective compound may be cleaved by treatment with aqueous formic acid to yield the free 16α,17α-dihydroxy compounds. These free diols may then be reacted with an aldehyde or ketone of the formula

wherein P and Q are as hereinbefore defined, in order to yield the desired 16,17-acetal or ketal derivatives. The reaction is preferably carried out by treating a suspension or solution of the 16,17-dihydroxy steroid in the aldehyde or ketone, with an acid catalyst, for example, perchloric acid, neutralizing the acid and recovering the acetal or ketal derivatives formed. Suitable aldehyde and ketone reactants include those set forth in U.S. Patent 3,077,471, issued February 12, 1963.

The 1-hydroxy final products may be acylated as by treatment with an acylating agent, for example, an acyl halide or acid anhydride, in the presence of an organic base, for example, pyridine or collidine, to yield the 1-acyloxy final products of this invention.

The invention may be illustrated by the following examples:

Example 1.—16α,17α-dimethylmethylenedioxy-4-methyl-$\Delta^{1,3,5(10)}$-19-norpregnatriene-1-ol-20-one A solution of 3.75 g. of 16α,17α-dimethylmethylenedioxy-$\Delta^5$-pregnene-3β, 19-diol-20-one in 400 ml. of dry toluene is added to a mixture of 12.2 g. of aluminum isopropoxide and 120 ml. of acetone in 540 ml. of dry toluene and the mixture is refluxed for sixteen hours. The mixture is cooled, diluted with benzene and washed with 2 N HCl, water, 5% sodium bicarbonate and twice again with water and evaporated to dryness in vacuo. The residue is crystallized from acetone-hexane to give 1.2 g. of 16α,17α-dimethylmethylenedioxy-19-norprogesterone. Evaporation of the mother liquor to dryness, in vacuo, followed by chromatography of the residue on Woelm neutral alumina (Activity V) using hexane-chloroform (2:1, v.:v.) gives a fraction which after evaporation of the solvent, in vacuo, and crystallization of the residue from acetone-hexane yields 390 mg. of 16α,17α-dimethylmethylenedioxy - 4 - methyl-$\Delta^{1,3,5(10)}$-19-norpregnatriene-1-ol-20-one, having a melting point of about 216–218° C.

Analysis.—Calc'd for $C_{24}H_{32}O_4$ (384.50): C, 74.97; H, 8.39. Found: C, 75.53; H, 8.78.

Example 2.—16α,17α-(β-methyl - α - phenylmethylenedioxy)4 - methyl-$\Delta^{1,3,5(10)}$-19 - norpregnatriene-1-ol-20-one Following the procedure set forth in Example 1, but substituting 16α,17α-(β-methyl-α-phenylmethylenedioxy)-$\Delta^5$-pregnene-3β,19-diol-20-one for 16α,17α-dimethylmethylenedioxy-Δ⁵-pregnene-3β,19-diol-20-one, there is obtained 16α,17α-(β-methyl - α - phenylmethylmethylenedioxy) - 4-methyl - Δ¹,³,⁵⁽¹⁰⁾-19-norpregnatriene-1-ol-20-one.

*Example 3.—16α,17α-dimethylmethylenedioxy-4-methyl-Δ¹,³,⁵⁽¹⁰⁾-19-norpregnatriene-1-ol-20-one 1-acetate*

To a solution of 50 mg. of 16α,17α-dimethylmethylenedioxy-4-methyl-Δ¹,³,⁵⁽¹⁰⁾-19-norpregnatriene-1-ol-20 - one in 3.0 ml. of anhydrous pyridine is added 1.0 ml. of acetic anhydride and the mixture is allowed to remain at room temperature for eighteen hours. Ice is then added and thirty minutes later the mixture is diluted slowly with 10 ml. of ice and water. The resulting precipitate is filtered, washed thoroughly with water, dried in vacuo and recrystallized from acetone-hexane yielding 16α,17α-dimethylmethylenedioxy - 4 - methyl - Δ¹,³,⁵⁽¹⁰⁾ - 19 - norpregnatriene-1-ol-20-one 1-acetate having a melting point of about 187–189°.

*Analysis.*—Calc'd for $C_{26}H_{34}O_5$ (426.53): C, 73.21; H, 8.04. Found: C, 72.61; H, 8.22.

Similarly, by substituting other acid anhydrides or acyl halides for the acetic anhydride in the procedure of Example 3, the corresponding 1-esters are formed. Thus butyric anhydride, propionic anhydride and benzoyl chloride yield the 1-butyrate, 1-propionate and 1-benzoate esters, respectively.

*Example 4.—4-methyl-Δ¹,³,⁵⁽¹⁰⁾-19-norpregnatriene-1,16,17-triol-20-one*

A solution of 16α,17α-dimethylmethylenedioxy-4-methyl-Δ¹,³,⁵⁽¹⁰⁾-19-norpregnatriene-1-ol-20-one in 90% formic acid is heated at 42° for twenty-two hours. The solvents are removed in vacuo, the crude residue is dissolved in methanol and treated under nitrogen with stirring with a 10% oxygen-free solution of potassium carbonate in water. After thirteen minutes at room temperature, the mixture is neutralized with glacial acetic acid and the solution concentrated in vacuo after the addition of water. Extraction with chloroform followed by drying over sodium sulfate and evaporation in vacuo furnishes a residue which on recrystallization from 95% methanol furnishes 4-methyl-Δ¹,³,⁵⁽¹⁰⁾-19-norpregnatriene-1,16,17-triol-20-one.

*Example 5.—16α,17α - (β - methyl-α-phenylmethylenedioxy)-4-methyl-Δ¹,³,⁵⁽¹⁰⁾ - 19 - norpregnatriene-1,16,17-triol-20-one*

To a suspension of 4-methyl-Δ¹,³,⁵⁽¹⁰⁾-pregnatriene-1,16,17-triol-20-one in acetophenone is added 72% perchloric acid and the mixture is agitated at room temperature for three hours. The mixture is then neutralized with dilute sodium bicarbonate and the acetophenone is removed in vacuo. The resulting crystalline solution is filtered and the crystals washed with water to yield after recrystallization 16α,17α-(β-methyl-α-phenylmethylenedioxy) - 4 - methyl - Δ¹,³,⁵⁽¹⁰⁾ - 19 - norpregnatriene - 1,16,17-triol-20-one.

The invention may be variously embodied within the scope of the appended claims.

What is claimed is:

1. A compound of the formula

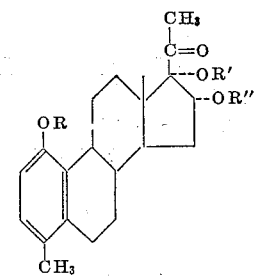

wherein R is selected from the group consisting of hydrogen and the acyl radical of hydrocarbon carboxylic acid of less than ten carbon atoms; each R' and R" is hydrogen; and together R' and R" is

wherein P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group consisting of monocyclic cycloalkyl and monocyclic heterocyclic.

2. 16α,17α-dimethylmethylenedioxy-4-methyl-Δ¹,³,⁵⁽¹⁰⁾-19-norpregnatriene-1-ol-20-one.

3. 16α,17α - (β - methyl - α - phenylmethylenedioxy)-4-methyl-Δ¹,³,⁵⁽¹⁰⁾-19-norpregnatriene-1-ol-20-one.

4. 16α17α - dimethylmethylenedioxy-4-methyl-Δ¹,³,⁵⁽¹⁰⁾-19-norpregnatriene-1-ol-20-one-1-acetate.

5. 4-methyl-¹,³,⁵⁽¹⁰⁾ - 19 - norpregnatriene-1,16,17-triol-20-one.

No references cited.

LEWIS GOTTS, *Primary Examiner.*

HENRY A. FRENCH, *Assistant Examiner.*